United States Patent [19]

Veloso et al.

[11] Patent Number: 5,946,628
[45] Date of Patent: Aug. 31, 1999

[54] METHOD AND CIRCUIT ARRANGEMENT FOR THE ACCESS OF CORDLESS TERMINALS TO A TELECOMMUNICATIONS SYSTEM

[75] Inventors: Artur Veloso, Göppingen; Joachim Endler, Stuttgart; Klaus Geywitz, Gerlingen; Gerd Siegmund; Hans-Joachim Adolphi, both of Stuttgart, all of Germany

[73] Assignee: Alcatel N.V., Rijswijk, Netherlands

[21] Appl. No.: 08/804,519

[22] Filed: Feb. 21, 1997

Related U.S. Application Data

[63] Continuation of application No. 08/409,759, Mar. 24, 1995, abandoned.

[30] Foreign Application Priority Data

Mar. 24, 1994 [DE] Germany ............................ 454 10 175

[51] Int. Cl.⁶ .................................................. H04Q 7/20
[52] U.S. Cl. ........................... 455/465; 455/555; 455/560
[58] Field of Search ........................... 455/403, 462–463, 455/465, 550, 560, 561, 555

[56] References Cited

U.S. PATENT DOCUMENTS 5,418,838  5/1995  Havermans et al. ...................... 379/60

FOREIGN PATENT DOCUMENTS

| 0562494 | 9/1993 | European Pat. Off. . |
| 4113596 | 11/1991 | Germany . |
| 4128811 | 3/1993 | Germany . |
| 2247811 | 3/1992 | United Kingdom . |

OTHER PUBLICATIONS

"Digital kommunizieren mit Dect", J. Nieder, *Funkschau* Oct. 1993, pp. 74–77.
"Schnurloses Telefon, Für den 900–MHz–Bereich", H. Bauer, NTZ, vol. 38 (1985), No. 7, pp. 468–471.
"Audioprozessor vereinfacht, NF–Signalaufbereitung im Mobilfunk", W. Blaesner, *NTZ,* vol. 43 (1990), No. 6, pp. 446–448 and 450–451.
"CT2 Base and Handset with Build–in Modem", Wong Sie Hui et al, *Motorola, Inc.*, 1993, pp. 110–111.
"A Business Cordless PABX Telephone System on 800 MHz Based on DECT Technology", C. Buckingham et al, *IEEE Communications Magazine,* January 1991, pp. 105–110.
"DECT—Cordless Functionalify in New Generaion Alcatel PABXs", V. Werbus et al, *Electrical Communication,* 2nd Quarter 1993, pp.172–180.
"Mobility in Private Networks", G. Havermans et al, *PTR Philips Telecommunication Review,* Aug. 1993, vol. 51, No. 2, pp. 35–40.

*Primary Examiner*—Dwayne D. Bost
*Assistant Examiner*—William G. Trost
*Attorney, Agent, or Firm*—Ware, Fressola, Van Der Sluys & Adolphson LLP

[57] ABSTRACT

The essential functions and characteristics of a telecommunications system with cordless terminals are established by the known DECT standard. On the one hand, the invention has the task of reducing the cost of ADPCM/PCM transcoders in DECT or DECT-like systems, and on the other to improve the handover characteristics, by making an interruption-free channel changeover, even during a change of cell bundles. To that effect, all DECT interface circuits (9, 10) are jointly controlled by a central processing unit (MOB CPU) assigned only to these DECT interface circuits (9, 10). The otherwise usual ADPCM/PCM transcoders have been omitted in the DECT interface circuits (9, 10), and are now assigned to the central processing unit (MOB CPU), while their number can be reduced in comparison to known solutions. The central processing unit (MOB CPU) also takes over the switching functions for the channels offered by the DECT interface circuits (9, 10). Since the channels from different DECT interface circuits (9, 10) are in frame-synchronous form, the central processing unit (MOB CPU) can carry out an interruption-free channel change during the cell bundle change of a cordless terminal.

2 Claims, 5 Drawing Sheets

METHOD AND CIRCUIT ARRANGEMENT FOR THE ACCESS OF CORDLESS TERMINALS TO A TELECOMMUNICATIONS SYSTEM

This application is a continuation of application Ser. No. 08/409,759 filed on Mar. 24, 1995, now abandoned.

TECHNICAL FIELD

The invention concerns a method and a circuit arrangement for the access of cordless terminals, for example cordless telephones, to a telecommunications system, for example a private branch exchange.

BACKGROUND OF THE INVENTION

The essential functions and characteristics of a telecommunications system have been determined by a European standardization committee, the European Telecommunications Standards Institute, ETSI for short, in a European standard for cordless telecommunication, DECT in short, the Digital European Cordless Telecommunications—Standard. This DECT standard is the basis for a cordless private branch exchange to which base stations are connected through DECT interface circuits. Each base station supplies a radio cell in which it establishes the radio connection with the cordless telephones, see V. Werbus, A. Veloso, A. Villanueva: DECT: Mobility in wireless private branch exchanges of the new Alcatel generation. Electrical Communication, 2. quarter 1993, pages 172–180. The radio transmission takes place via ten carrier frequencies in a frequency band established by the DECT standard. As shown in FIG. 2 of the above-mentioned article, each of these carriers is subdivided into 24 time slots, where the first twelve are used for transmission from the base station to the cordless telephone, the remaining twelve for the inverse direction of transmission. In this way, twelve cordless telephones can be serviced simultaneously by one base station. Since the pulse code modulated (PCM)-coded speech is converted into Adaptive Differential Pulse Code Modulation (ADPCM)-code before the radio transmission, each base station must therefore contain an ADPCM/PCM transcoder for every potential call, as shown in FIG. 4 of the above-mentioned article. As also shown in FIG. 4 thereof, two base stations are managed by a special DECT interface circuit arrangement in the above named wireless private branch exchange (see FIG. 3 of the article). The two radio cells form a cell bundle. To reduce the expense of 24 ADPCM/PCM transcoders per cell bundle, 16 simultaneous communication connections per cell bundle are admitted according to the practical requirements, which are distributed to the two base stations according to need. Still, the cost of sixteen ADPCM/PCM transcoders is very high, and there is a desire to reduce the number of ADPCM/PCM transcoders without limiting the access possibilities, in order to attain a reduction in the costs. To always make the radio connection with the best quality available, and to enable the cordless telephone to make a change in location during a call, the DECT standard provides for an interruption-free channel change within a radio cell or a cell bundle. Although a change from one cell bundle to another is possible, it is only possible with an automatic reestablishment of a new connection. This involves a low data loss which does not disturb the voice transmission, but can lead to errors in the data transmission. It is therefore desirable to also be able to perform the change of a cell bundle, the so-called board-handover, without interruptions.

DISCLOSURE OF INVENTION

The invention now fulfills the task of organizing the access of cordless terminals to a telecommunications installation in such a way, that on the one hand the hardware expense is lowered, and on the other performance characteristics are improved.

According to the invention, a method for accessing cordless terminals to a telecommunications system with a number of interface circuits for cordless terminals and/or wired terminals, and for connecting them to other networks, such as public analog telephone networks and/or integrated services digital networks, comprising the steps of accessing only one at a time of interface circuits for interfacing cordless terminals to a central processing unit.

According further to the method of the invention, messages transmitted in ADPCM format from a base station which is connected by a radio path between the cordless terminal and an interface circuit for cordless terminals are transmitted by the respective interface circuit or cordless terminals to the central processing unit, where the coding format is converted from ADPCM to PCM.

According further to the method of the invention, messages coded in the ADPCM format are frame-synchronously transmitted through different channels by the base stations assigned to the interface circuit for cordless terminals through exchange units, which are present in the respective interface circuit for cordless terminals, to a switching unit contained in the central processing unit, and wherein an interruption-free channel change takes place in the central processing unit during the transition of a cordless terminal from a first cell bundle to a second cell bundle.

According to the apparatus of the invention, a circuit for performing the above-mentioned method wherein a certain number of base stations is assigned to each interface circuit for cordless terminals, wherein each base station is connected with the exchange unit through an application-specific circuit, wherein each exchange unit is switched by a bus to the switching unit in the central processing unit, wherein the outlet of the switching unit is connected by an ADPCM/PCM transcoder to a master control module, to which the interface circuits for wired terminals are also switched, so that the new central processing unit and the interface circuits for wired terminals have the same right to the master control module with respect to their logical function.

The essence of the invention lies in that the master central processing unit is practically relieved from managing the mobility of the subscribers, and the switching processes are shifted from the PCM side of the coded signal to the ADPCM side, and are taken over by a special unit, the so-called mobile central processing unit MOB CPU. In regard to the telecommunications system, this mobile central processing unit operates like an interface circuit for wired subscribers and can therefore be managed by the master central processing unit. By centrally controlling a number of DECT interface circuit arrangements, the invention makes possible a reduction in the number of PCM/ADPCM transcoders and in addition an interruption-free cell bundle change.

These and other objects, features and advantages of the present invention will become more apparent in light of the detailed description of a best mode embodiment thereof, as illustrated in the accompanying drawing.

BEST MODE FOR CARRYING OUT THE INVENTION

Figure 1:
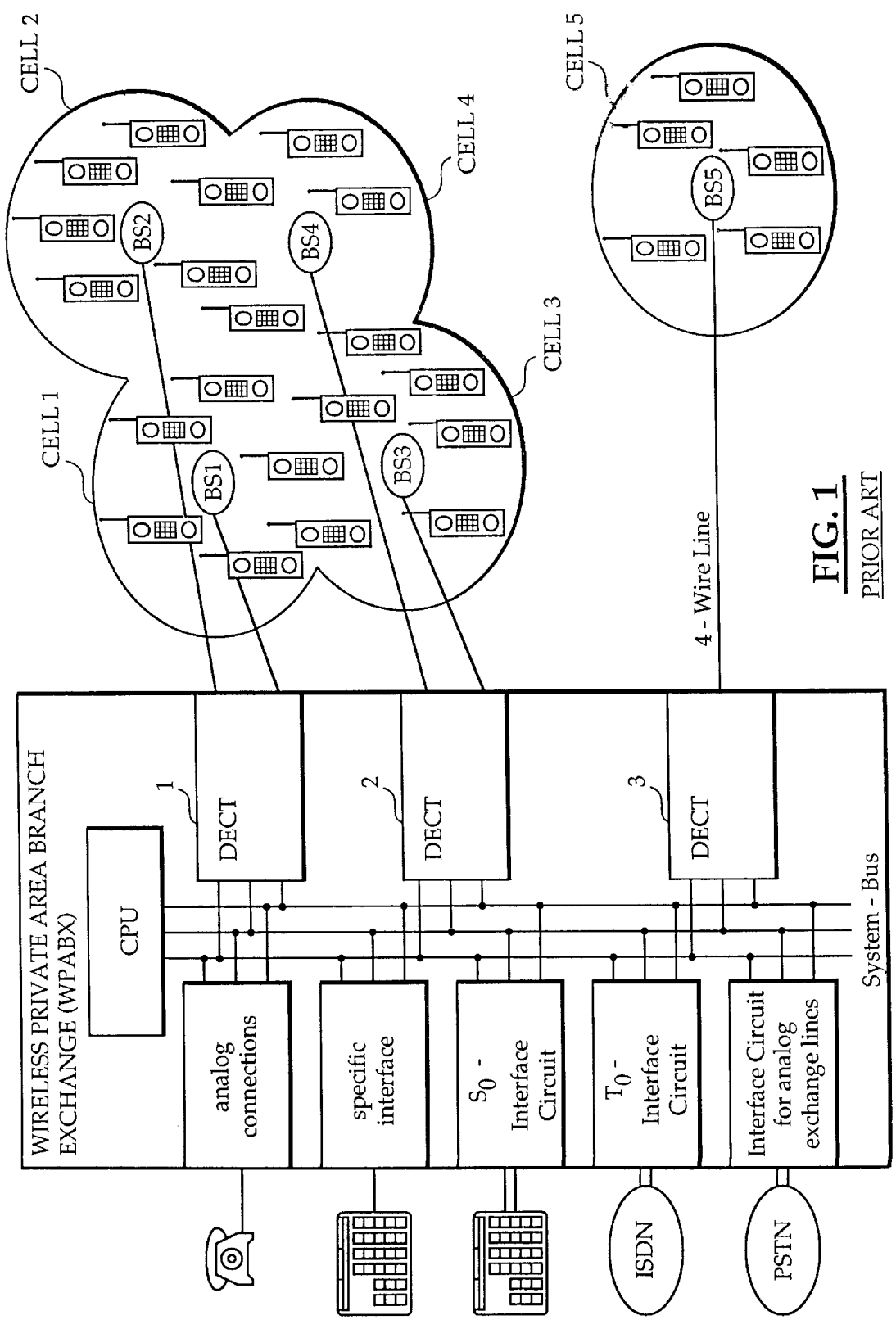
FIG. 1 shows a configuration of a cordless telecommunications system according to the state of the art.
Figure 2:
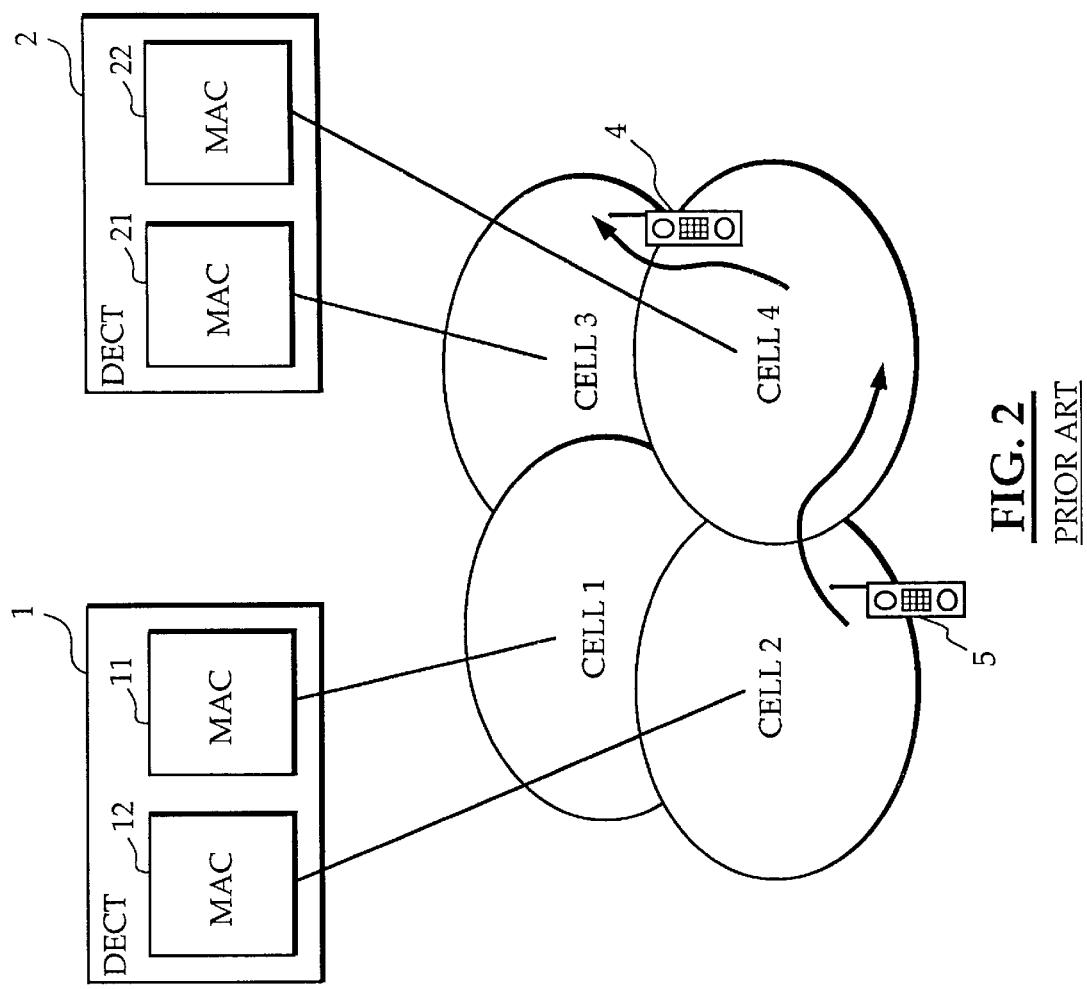
FIG. 2 shows a block circuit diagram of two DECT interface circuit arrangements according to the state of the art.

According to FIG. 1, a cordless telecommunications system, in the present case a Wireless Private Area Branch Exchange WPABX, essentially comprises a master central processing unit CPU which manages different interfaces through a system bus. Such an installation can be used as an autonomous installation for connecting wired and/or cordless terminals. But it is also possible to connect the installation to existing networks. An interface circuit for analog exchange lines makes it possible to connect to a Public Switched Telephone Network PSTN, a $T_O$-interface circuit enables the connection to an Integrated Services Digital Network ISDN. The base stations BS1 . . . BS5 are connected by four-wire lines to the DECT interface circuits 1, 2, 3. Each base station BS1 . . . BS5 supplies a radio cell 1 . . . cell 5 surrounding it, and establishes the radio connection to the cordless terminals therein. The number of DECT interface circuits and the number of base stations in FIG. 1 is only given as an example, the actual number depends on the size of the environment being supplied and on the number of subscribers. According to FIG. 2, each DECT interface circuit 1, 2 contains at least one application-specific circuit, which may be integrated circuits, two application-specific integrated circuits 11, 12 and 21, 22 being shown in each DECT in FIG. 2, to each of which one base station is connected. The radio cell 1, cell 2, cell 3 and cell 4 are supplied by a DECT interface circuit 1, 2 and form a radio bundle in each case. FIG. 2 illustrates two situations which can take place due to the mobility of the cordless terminals 4, 5. In addition to the interruption-free channel change within a radio cell, an interruption-free channel change is also possible within a cell bundle, if a first cordless terminal 4 moves for example from radio cell 4 to radio cell 3. By changing its location, a second cordless terminal 5 changes for example from a first cell bundle made up of cell 1 and cell 2, to a second cell bundle made up of cell 3 and cell 4. According to the known state of the art, such a cell bundle change requires a reestablishment of the connection, however the channel change is then not interruption-free. The solution according to the invention now makes an interruption-free cell bundle change possible, which advantageously does not entail any data loss. The reasons are explained in conjunction with FIG. 4.

Figure 3:
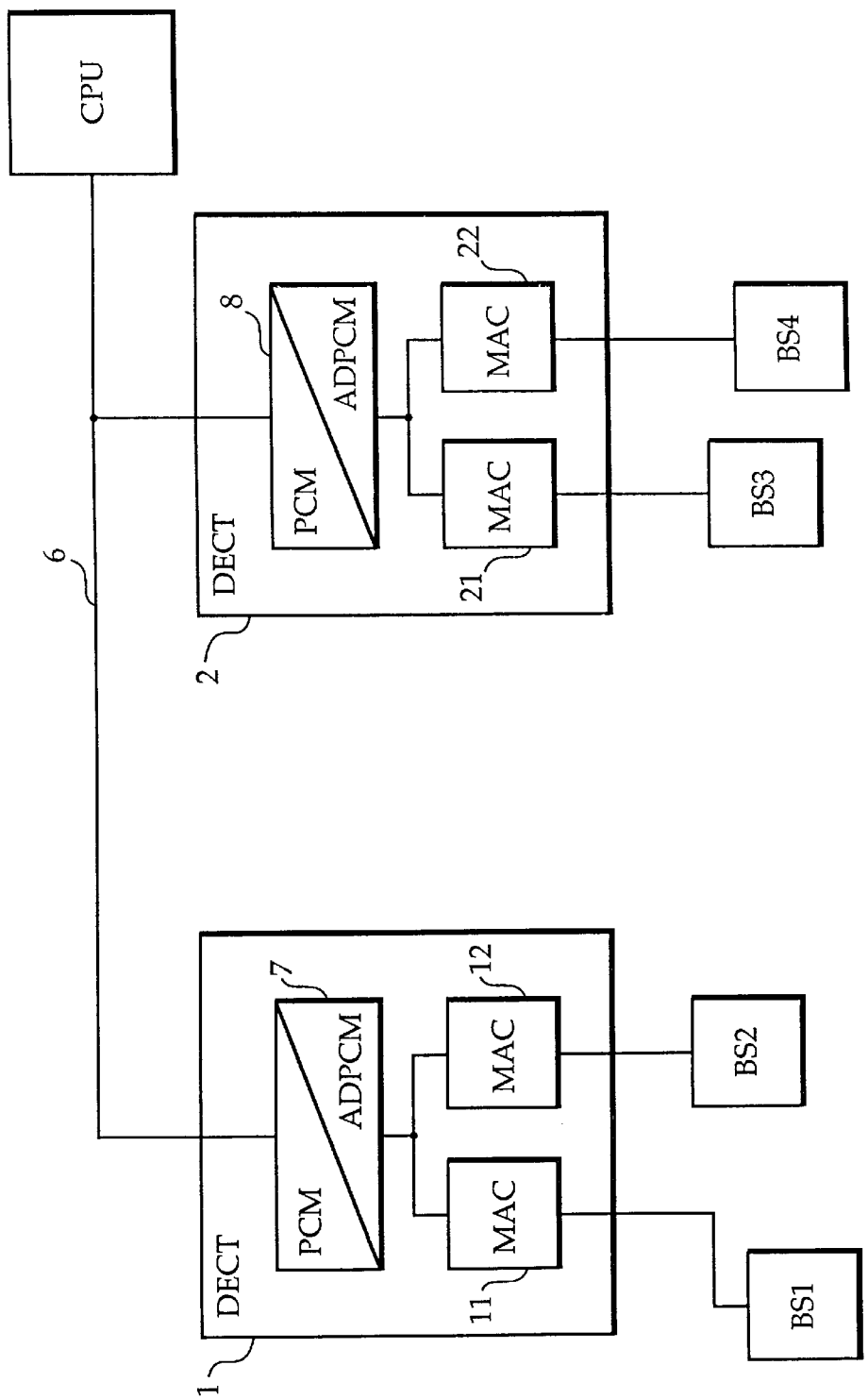
FIG. 3 shows a block circuit diagram of two DECT interface circuit arrangements with a PCM-system bus according to the state of the art.

FIG. 3 illustrates that, in the known manner, each DECT interface circuit 1, 2 contains a certain number of ADPCM/PCM transcoders, representatively depicted here as a first ADPCM/PCM transcoder 7 in the first DECT interface circuit 1, and a second ADPCM/PCM transcoder 8 in the second DECT interface circuit 2. Since each base station BS1 . . . BS4 can service twelve cordless terminals simultaneously because of the twelve time slots per carrier frequency, a maximum of twenty-four ADPCM/PCM transcoders are required per DECT interface circuit 1, 2. Depending on the anticipated traffic, this number can be reduced in practice to sixteen ADPCM/PCM transcoders for example, where a special control of the application-specific circuits 11, 12 lets the sixteen ADPCM/PCM transcoders to be functionally distributed to the two base stations, according to need. Management of the DECT interface circuits 1, 2 with the connected base stations BS1 . . . BS4 and the cordless terminals they service, takes place with PCM-coded signals from the master central processing unit CPU through the system bus 6. Managing the mobility of the cordless terminals demands a large portion of the computer load.

Figure 4:
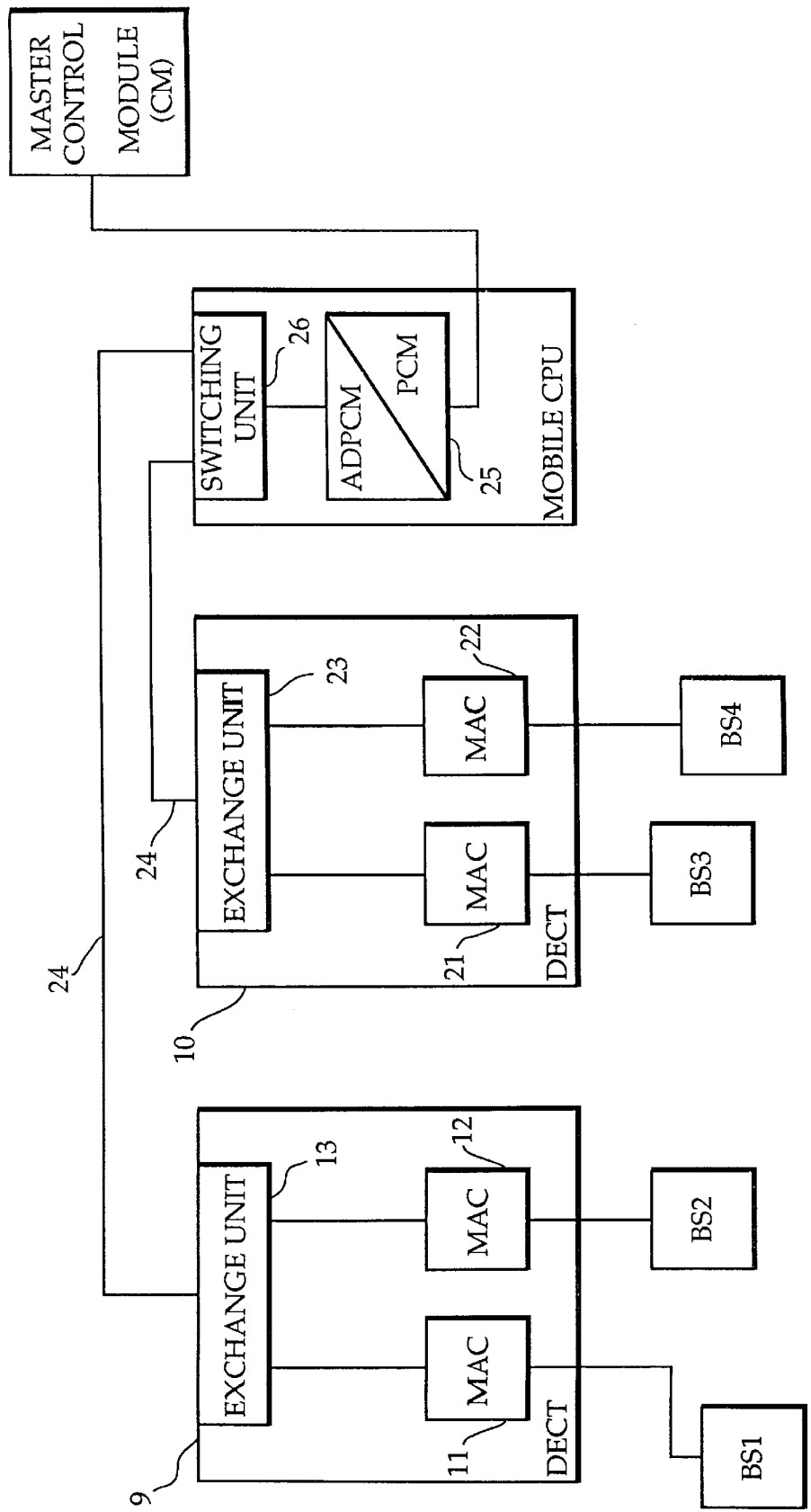
FIG. 4 shows a block circuit diagram of the circuit arrangement according to the invention.

FIG. 4 illustrates the circuit arrangement according to the invention, which comprises two DECT interface circuits 9, 10 altered in accordance with the known state of the art, a new central processing unit MOB CPU and a master control module CM. Management of the mobility now rather takes place through the new central processing unit MOB CPU, and the burden of the master central processing unit is significantly reduced. This new circuit structure has the following further advantages. The new DECT interface circuits 9, 10 contain no ADPCM/PCM transcoder. The data are transmitted to the new central processing unit MOB CPU in ADPCM-code, while each application-specific circuit 11, 12 and 21, 22 has access to a respective multiple ADPCM line 24, through a simple exchange unit 13 and 23. Conversion of the coding format from ADPCM to PCM takes place in the new central processing unit MOB CPU, which now contains the ADPCM/PCM transcoders. The new central processing unit MOB CPU further contains a switching unit 26 through which the multiple ADPCM lines 24 have access to the ADPCM/PCM transcoders. In this way, the new central processing unit MOB CPU takes over an exchange function for all DECT interface circuits 9, 10, so that the number of ADPCM/PCM transcoders is now determined by the number of cordless terminals and their traffic values, and can be drastically and advantageously reduced in comparison to the total number of ADPCM/PCM transcoders previously contained in the DECT interface circuits 1, 2.

As a new performance characteristic, the circuit structure of the invention makes an interruption-free cell bundle change possible. During the transition from a first cell bundle, supplied by the new first DECT interface circuit 9, to a second cell bundle, supplied by the new second DECT interface circuit 10, the same messages are transmitted in different time slots by exchange unit 13 and 23 to the switching unit 26. The messages thus exist frame-synchronously in two channels, so that the new central processing unit MOB CPU can access the switching unit 26, and switch from a channel of the first cell bundle to a channel of the second cell bundle without any interruption, thereby making the so-called interruption-free board-handover possible.

Figure 5:
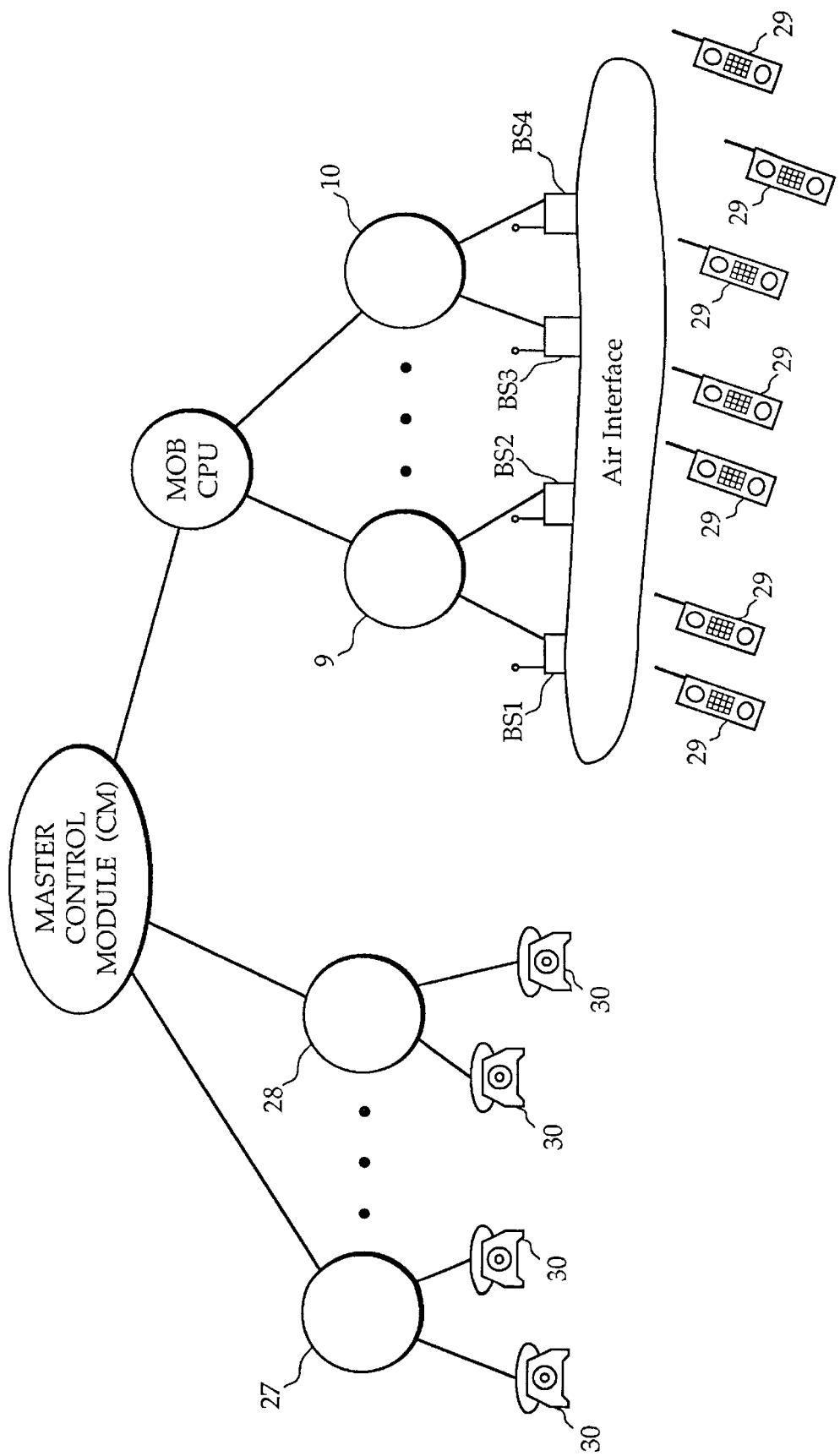
FIG. 5 shows a schematic circuit of a telecommunications installation with the circuit arrangement of the invention.

FIG. 5 depicts a schematic diagram of the physical connection of a telecommunications installation to cordless terminals 29 and wired terminals 30. The view of the telecommunications installation, in this instance from the viewpoint of the master control module CM, only wired users are seen, since the interface circuits 27, 28 for wired terminals and the new central processing unit MOB CPU for master control module CM perform the same logical functions. All functions concerned with the mobility of the cordless terminals 29 are carried out by the new central processing unit MOB CPU and do not affect the master control module CM.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

We claim:

1. Apparatus for connecting wireless terminals to at least one communications network (PSTN, ISDN), comprising:
   a plurality of base station interfaces (9, 10), each comprising:
      a plurality of application-specific circuits (11, 12; 21, 22) for connection to a corresponding plurality of base stations (BS1, BS2; BS3, BS4) for communication therebetween using ADPCM, each base station for communicating by radio using said ADPCM to a plurality of said wireless terminals (29); and
      an exchange unit (13; 23) connected to said base station interfaces (9, 10) for communication therebetween using said ADPCM;
   a central processing unit (MOB CPU) comprising:
      a switching unit (26) connected to said exchange unit (13; 23) of each of said plurality of base station interfaces for communication therebetween using said ADPCM; and
      a plurality of ADPCM/PCM transcoders (25) connected to said switching unit for communication therebetween using said ADPCM; and
   a master control module (CM) connected to said plurality of ADPCM/PCM transcoders of said central processing unit for communication therebetween using PCM,
   wherein management of mobility of a wireless terminal changing between cells served by base stations connected to different base station interfaces only takes place through the central processing unit (MOB CPU) accessing said switching unit (26) and switching from a channel of a first cell bundle to a channel of a second cell bundle without any interruption.

2. The apparatus of claim 1, further comprising:
   a plurality of interface circuits (27, 28) for connection to wired terminals and connected to said master control module (CM), wherein both said central processing unit (MOB CPU) and said plurality of interface circuits (27, 28) for connection to wired terminals perform the same logical functions so that from the viewpoint of the master control module (CM) only wired users are seen, since management of mobility of the wireless terminals is carried out by the central processing unit (MOB CPU).

* * * * *

UNITED STATES PATENT AND TRADEMARK OFFICE
CERTIFICATE OF CORRECTION

PATENT NO   :   5,946,628
DATED       :   August 31, 1999
INVENTOR(S) :   Veloso et al It is certified that error appears in the above-identified patent and that said Letters Patent is hereby corrected as shown below:

On the title page:

Item [56], after line 3, please add the following references:

--5,440,613   8/1995   Fuentes      379/60
  5,483,668   1/1996   Malkamaki    379/60X--.

Signed and Sealed this

First Day of February, 2000

Attest:

Attesting Officer

Q. TODD DICKINSON

Acting Commissioner of Patents and Trademarks